United States Patent [19]

Gurien et al.

[11] 3,832,397

[45] Aug. 27, 1974

[54] PROCESS FOR SUBSTITUTED SULFONYLUREAS

[75] Inventors: Harvey Gurien, Maplewood; Albert Israel Rachlin, Verona; Sidney Teitel, Clifton, all of N.J.

[73] Assignee: Hoffman-La Roche Inc., Nutley, N.J.

[22] Filed: Oct. 10, 1972

[21] Appl. No.: 296,483

Related U.S. Application Data

[63] Continuation-in-part of Ser. No. 21,181, Mar. 19, 1972, abandoned.

[52] U.S. Cl. .............................. 260/553 D, 424/322
[51] Int. Cl. ......................................... C07c 127/12
[58] Field of Search ................................ 260/553 D

[56] References Cited
UNITED STATES PATENTS 3,334,302   8/1967   Beregi et al. ..................... 260/553 D
3,420,882   1/1969   Muth et al. ....................... 260/553 D
3,439,033   4/1969   Haack et al. ..................... 260/553 D
3,504,026   3/1970   Aumuller et al. ................ 260/553 D

FOREIGN PATENTS OR APPLICATIONS 604,259   6/1948   Great Britain ................. 260/553 D

*Primary Examiner*—Bernard Helfin
*Assistant Examiner*—Gerald A. Schwartz
*Attorney, Agent, or Firm*—Samuel L. Welt; Bernard S. Leon; William G. Isgro

[57] ABSTRACT

Bicyclic sulfonylurea derivatives have been prepared by reacting (1R)-3-endo-amino-2-endo-bornanol, hereinafter referred to as (D)-3-endo-aminoborneol, with alkylphenylsulfonyl ureas. The bicyclic sulfonylurea derivatives are useful as hypoglycemic agents.

4 Claims, No Drawings

3,832,397

PROCESS FOR SUBSTITUTED SULFONYLUREAS

CROSS-REFERENCE TO RELATED APPLICATIONS

This application is a continuation-in-part of U.S. Pat. application Ser. No. 21,181, filed Mar. 19, 1972 now abandoned.

BRIEF SUMMARY OF THE INVENTION

The invention is concerned with a process for producing hypoglycemic 1-[(1R)-2-endo-hydroxy-3-endo-bornyl]-3-(alkyl-phenylsulfonyl)-ureas which comprises reacting (D)-3-endoaminoborneol with the corresponding alkylphenylsulfonyl urea.

DETAILED DESCRIPTION OF THE INVENTION

As used herein, the term "alkyl" preferably denotes a straight chain or branched chain lower alkyl group containing 1-7 carbon atoms, e.g., methyl, ethyl, propyl, isopropyl, butyl, pentyl, hexyl and the like.

The invention relates to a process for preparing 1-[(1R)-2-endo-hydroxy-3-endo-bornyl]-3-(lower alkyl-phenylsulfonyl)ureas by reacting (D)-3-endo-aminoborneol with the corresponding lower alkylphenylsulfonyl urea in the presence of a solvent.

Exemplary of the alkylphenylsulfonyl ureas utilized as reactants are:

p-tolylsulfonylurea;
o-tolylsulfonylurea;
m-tolylsulfonylurea;
p-ethylphenylsulfonylurea;
p-propylphenylsulfonylurea; and the like.

The (D)-3-endo-aminoborneol reactant utilized in the process is a known compound and is readily available.

In the process of the invention, any convenient order of mixing the reactants may be employed. Preferably, the alkylphenylsulfonyl urea should be present in the reaction mixture in at least an equimolar quantity with the (D)-3-endo-aminoborneol, although greater or lesser quantities of the alkylphenylsulfonyl urea may be utilized.

The reaction is carried out under suitable reaction conditions which include the utilization of a solvent as hereinafter described. Generally, after the (D)-3-endo-aminoborneol and lower alkylphenylsulfonyl urea have been introduced into the reaction mixture, the reaction is carried out at a temperature in the range of about room temperature to about 100°C. Conveniently, the reaction may be carried out at a temperature in the range of about 50° to about 100°C. Preferably, however, the reaction is carried out at a temperature in the range of about 75° to about 85°C. Although the time required for the reaction to be completed varies with the quantity of reactants and the reaction temperature, generally about 2 to 25 hours are required. Preferably, the reaction is allowed to continue until the reaction mixture substantially ceases to liberate ammonia, a by-product. Conveniently, a nitrogen stream facilitates the removal of the ammonia formed in the course of the reaction thereby shortening the reaction time.

The process of the invention is conducted in the presence of a solvent selected from the group consisting of isopropanol, acetonitrile, dioxane, pyridine, ethyl acetate and 1,2-dimethoxyethane. Preferred of these are isopropanol, acetonitrile and ethyl acetate or acetonitrile and ethyl acetate; most preferred is acetonitrile. The quantity of solvent to be utilized is not critical; however, generally sufficient solvent is utilized to permit efficient agitation of the mixture.

After completion of the reaction, the desired product of the process of the invention, i.e., the 1-[(1R)-2-endo-hydroxy-3-endo-bornyl]-3-(alkylphenylsulfonyl)-urea, may be isolated from the reaction mixture by any conventional method, for instance, by concentration, extraction, crystallization and the like. The 1-[(1R)-2-endo-hydroxy-3-endo-bornyl]-3-(alkylphenylsulfonyl)-ureas may alternatively be named, for example, as 1-(alkylphenylsulfonyl)-3-(2-endo-hydroxy-3-endo-D-bornyl)-ureas.

The 1-[(1R)-2-endo-hydroxy-3-endo-bornyl]-3-(alkylphenylsulfonyl)-ureas form salts with pharmaceutically acceptable bases. Thus they form salts with pharmaceutically acceptable bases which preferably include alkali metal bases such as sodium hydroxide, potassium hydroxide and the like.

The 1-[(1R)-2-endo-hydroxy-3-endo-bornyl]-3-(alkylphenylsulfonyl)-ureas are distinguished by their blood sugar depressant activity on oral administration. Accordingly, they are useful as hypoglycemic agents or as anti-diabetic agents. Their useful hypoglycemic properties are manifested upon administration to warm-blooded animals. For example, when 1-[(1R)-2-endo-hydroxy-3-endo-bornyl]-3-(p-tolylsulfonyl)-urea which has an $LD_{50}$ of 5000 mg/kg. p.o. in rats is administered to dogs in doses in the range of 0.35 to 3.0 mg/kg. it causes a marked lowering of blood sugar levels over a 24-hour period as compared to controls.

The 1-[(1R)-2-endo-hydroxy-3-endo-bornyl]-3-(alkylphenylsulfonyl)-ureas can be used as medicaments in the form of tablets, capsules or dragees. Suitable dosage units contain from about 10 to 250 mg. Suitable dosage regimens in warm-blooded mammals are from about 0.15 mg/kg. per day to about 7.0 mg/kg. per day, but for any particular subject, the specific dosage regimen should be adjusted according to individual need and professional judgment of the person administering or supervising the administration of the compounds.

The orally administerable pharmaceutical preparations can contain in admixture with the 1-[(1R)-2-endo-hydroxy-3-endo-bornyl]-3-)alkylphenylsulfonyl)-ureas, organic or inorganic carrier materials, such as, for example, lactose, starch, talc, magnesium stearate, and the like. They can also contain other active ingredients, including other hypoglycemic agents.

The following examples further illustrate the invention. All parts are by weight and all temperatures are in degrees centigrade.

EXAMPLE 1

Preparation of 1-[(1R)-2-endo-hydroxy-3-endo-bornyl]-3-(p-tolylsulfonyl)urea*

*Also known as 1-(p-toluenesulfonyl)-3-(2-endo-hydroxy-3-endo-D-bornyl)-urea.

A mixture containing 200 g. of (D)-3-endo-aminoborneol, 252 g. of p-tolylsulfonylurea and 4 l. of acetonitrile, contained in a 12 l. three neck flask, was stirred and refluxed for 19 hours. The resultant slightly turbid solution was allowed to cool to room temperature, seeded, stirred for 1 hour and filtered. The crystals which formed were washed with approximately 200–250 ml. of acetonitrile, dried in vacuum and weighed 236.1 g. and had a melting point of 202°–203°.

The acetonitrile filtrate was concentrated to dryness at reduced pressure to give 187.8 g. of an off-white powder. The material was stirred 24 hours at room temperature with 1,100 ml. of 1:1 acetone-water, filtered, washed with two 150 ml. portions of cold (5°) 1:1 acetone-water and dried in vacuum. The yield was 120.2 g. of powdery white crystals having a melting point of 201.5°–202.0°, for a combined yield of 356.3 g. (82.3 percent of theory) of 1-[(1R)-2-endo-hydroxy-3-endo-bornyl]-3-(p-tolylsulfonyl)urea, 99.6 percent pure by phase solubility analysis, $[\alpha]_D^{25}+65.4°$ ($c=1$, methanol).

EXAMPLE 2

In an analogous manner to Example 1, when 6.32 g. of p-tolylsulfonylurea are reacted with 5.00 g. of (D)-3-endo-aminoborneol in 100 ml. of ethyl acetate, 8.2 g. of 1-[(1R)-2-endo-hydroxy-3-endo-bornyl]-3-(p-tolylsulfonyl)urea (76 percent yield) are obtained.

EXAMPLE 3

In an analogous manner to Example 2, when 8.43 g. of p-tolylsulfonylurea are reacted with 6.68 g. of (D)-3-endo-aminoborneol in 84 ml. of isopropanol, 8.4 g. of 1-[(1R)-2-endo-hydroxy-3-endo-bornyl]-3-(p-tolylsulfonyl)urea (58.3 percent yield) are obtained.

EXAMPLE 4

Tablets of the following composition are prepared, utilizing conventional procedures:

| | | |
|---|---|---|
| 1-[(1R)-2-endo-hydroxy-3-endo-bornyl]-3-(p-tolylsulfonyl)urea | 50 | mg. |
| Avicel | 90 | mg. |
| Corn Starch | 9.9 | mg. |
| Magnesium Stearate | 0.1 | mg. |
| Total | 150 | mg. |

I claim:

1. A process for preparing 1-[(1R)-2-endo-hydroxy-3-endo-bornyl]-3-(p-tolylsulfonyl)urea, which comprises reacting (D)-3-endo-amino-borneol with p-tolylsulfonyl urea in the presence of acetonitrile.

2. A process in accordance with claim 1, wherein the reaction is conducted at a temperature in the range of about 50° to about 100°C.

3. A process for preparing 1-[(1R)-2-endo-hydroxy-3-endo-bornyl]-3-(p-tolylsulfonyl)urea, which comprises reacting (D)-3-endo-amino-borneol with p-tolylsulfonyl urea in the presence of ethyl acetate.

4. A process in accordance with claim 3, wherein the reaction is conducted at a temperature in the range of about 50° to about 100°C.

* * * * *

UNITED STATES PATENT OFFICE
CERTIFICATE OF CORRECTION

PATENT NO. : 3,832,397
DATED : August 27, 1974
INVENTOR(S) : Harvey Gurien, Albert Israel Rachlin & Sidney Teitel It is certified that error appears in the above-identified patent and that said Letters Patent are hereby corrected as shown below:

Cover Page, [63] Related U.S. Application Data
"Continuation-in-part of Ser. No. 21,181, March 19, 1972, abandoned"

should be:

Continuation-in-part of Ser. No. 21,181, March 19, 1970, abandoned

Column 1, line 7, "1972" should be:

1970

Signed and Sealed this fourth Day of May 1976

[SEAL]

Attest:

RUTH C. MASON
Attesting Officer

C. MARSHALL DANN
Commissioner of Patents and Trademarks